(12) United States Patent
Sheridan et al.

(10) Patent No.: US 9,022,062 B2
(45) Date of Patent: May 5, 2015

(54) VALVE

(75) Inventors: Simon Sheridan, Broom (GB); Martin Jarvis, Okehampton (GB); Geraint Huw Morgan, Milton Kenes (GB)

(73) Assignee: The Open Univeristy, Innovation & Enterprise, Milton Keynes, Buckinghamshire (GB)

( * ) Notice: Subject to any disclaimer, the term of this patent is extended or adjusted under 35 U.S.C. 154(b) by 1038 days.

(21) Appl. No.: 13/127,050

(22) PCT Filed: Oct. 30, 2009

(86) PCT No.: PCT/GB2009/002584
§ 371 (c)(1),
(2), (4) Date: Jul. 12, 2011

(87) PCT Pub. No.: WO2010/049699
PCT Pub. Date: May 6, 2010

(65) Prior Publication Data
US 2011/0278483 A1    Nov. 17, 2011

(30) Foreign Application Priority Data
Oct. 30, 2008    (GB) .................................. 0819940.8

(51) Int. Cl.
*F16K 17/38*    (2006.01)
*F16K 31/02*    (2006.01)
(Continued)

(52) U.S. Cl.
CPC ............... *F16K 31/025* (2013.01); *F16K 1/123* (2013.01); *F16K 31/004* (2013.01)

(58) Field of Classification Search
USPC .............. 251/11, 129.02, 341, 347, 349, 353, 251/129.06, 129.08; 137/354, 468
See application file for complete search history.

(56) References Cited

U.S. PATENT DOCUMENTS 3,022,038 A * 2/1962 Roubeau et al. ................. 251/11
5,147,333 A   9/1992 Raines
5,184,652 A   2/1993 Fan
(Continued)

FOREIGN PATENT DOCUMENTS

CN    1068745       2/1993
DE    10027379      12/2001
(Continued)

OTHER PUBLICATIONS

Translation of EP 1204906, May 15, 2002.*
(Continued)

*Primary Examiner* — Kevin Lee
*Assistant Examiner* — P. Macade Nichols
(74) *Attorney, Agent, or Firm* — Dekel Patent Ltd.; David Klein

(57) ABSTRACT

A valve device (1) comprising; a body portion (2) having a plurality of openings, a valve seat (6) located within said body portion (2), an end stop (4,8), corresponding to an opening of said body portion (2), said end stop (4,8) comprising a port portion (38,39) through which fluid may flow, and a nozzle (33,35), in fluid communication with said port portion (38, 39), said nozzle (33,35) configured for sealing against said valve seat (6) and thereby preventing flow through the valve device (1), the valve device (1) being openable by relative motion of said nozzle (33,35) with respect to said valve seat (6), and adjustment means configured to allow independent adjustment of the location of said nozzle (33,35) with respect to said valve seat (6).

20 Claims, 3 Drawing Sheets

(51) Int. Cl.
*F16K 1/12* (2006.01)
*F16K 31/00* (2006.01)

(56) References Cited

U.S. PATENT DOCUMENTS

| | | | |
|---|---|---|---|
| 5,353,837 A | | 10/1994 | Faust |
| 6,142,443 A | * | 11/2000 | Potschin et al. ............ 251/57 |

FOREIGN PATENT DOCUMENTS

| | | |
|---|---|---|
| EP | 1204906 | 10/2003 |
| FR | 2067420 | 8/1978 |
| JP | S41-006665 | 4/1966 |
| JP | S51-089224 | 8/1976 |
| JP | S61-016460 | 1/1986 |
| JP | S63-026480 | 2/1988 |
| JP | H03-157570 | 7/1991 |
| JP | H05-240372 | 9/1993 |
| JP | 2001-027163 | 1/2001 |
| WO | 01/11437 | 2/2001 |

OTHER PUBLICATIONS

Letter reporting Chinese Search Report, letter dated Dec. 12, 2013; Chinese Search Report is for corresponding Chinese Patent Application 200980143630.1, and the Chinese Search Report is dated Jul. 19, 2013.

Letter reporting Japanese Search Report, letter dated Sep. 3, 2014; Japanese Search Report is for corresponding Japanese Patent Application 2011-533819, and the Japanese Search Report is stamped with the date Dec. 25, 2013.

* cited by examiner

VALVE

The present invention relates to the field of valve devices, in particular valve devices for delivering precise doses of fluids (gas or liquid). The invention also relates to valve devices that operate proportionally and to valve devices that operate as pressure-reducing devices, for example in gas supply systems, and as a method of gas or liquid dosing.

Systems that require a supply of gas or liquid often require a well-controlled dose, pressure or flow rate to be delivered. For example, in the field of gas chromatography the provision of a well-controlled flow rate or pressure is usually necessary so that meaningful results may be obtained.

Systems that require a supply of fluid often have this fluid stored at a high pressure, and often it is necessary to deliver the fluid at a reduced pressure. For example gas used in gas chromatography systems is generally supplied from a high-pressure cylinder, which may contain gas at a pressure of around 200 Bar. In contrast, the pressure required within a gas chromatograph will generally be far lower, and is generally required at a low flow rate. The accurate control of gas in such circumstances is difficult.

Commonly the reduction in pressure from the high storage pressure to the lower delivery pressure is achieved through use of a pressure stepdown regulator. For example in gas chromatography a regulator may be used to lower the gas pressure from 200 Bar to a much lower pressure in the region of 5 Bar, and subsequently low pressure valves may be used to control the flow of gas. A valve that can deliver a precisely controlled low pressure outlet directly from a high pressure supply may remove the need for additional stepdown pressure regulators.

A desirable feature of valves is high impermeability to the fluid when in the closed state. This may be important for conservation of the stored fluid or correct operation of the system. A common gas used in gas chromatography systems is Helium. Helium is a relatively difficult gas to supply in accurate doses since it will tend to leak through valves that do not have a suitably high degree of impermeability when closed.

There is therefore a need for a valve that can both deal with high input pressures, low output pressures and low flow rates. Such valves may also require a high degree of impermeability in their closed state to prevent leakage of the fluid. High impermeability may be achieved through the application of high forces at sealing interfaces of appropriate design. Furthermore, it is beneficial in situations where high purity gases are required that the actuator is outside of the fluid flow path to minimize contamination of the fluid. Furthermore it may be beneficial for the actuator to be outside the fluid flow path for reasons of materials compatibility between the actuator and the fluid. The fluid flow path is sometimes referred to as the wetted area.

Generally speaking, precise fluid metering from a high pressure source is beneficial in a wide range of systems in which it is desirable to maximise the resource by maximising the pressure of the fluid stored, whilst providing a precisely controlled flow of the gas or liquid.

Further examples of such systems include Hydrogen fuel cells and spacecraft propulsion systems. Spacecraft propulsion systems, for example, may be used to manoeuvre micro satellites by releasing precisely controlled doses of gas for use in either electric propulsion systems or in cold gas thruster systems.

EP-A-1204906 discloses a thermally controlled gas valve that is configured to permit the flow of gas when the valve is heated. Upon heating, the effect of thermal expansion causes nozzles within the valve to move away from a valve seat, and this opens the valve. During assembly of the valve, laser welds are used to provide gas-tight seals between the various component parts of the valve and to fix the relative positions of these components.

During this welding process, the components are also heated and will consequently thermally expand. The thermal expansion allows a closing force to be built into the valve since, after the welding is complete and the components cool, the valve will contract.

However, aside from varying the temperature of the valve, no adjustment of the valve's parameters, such as the closing force at a given temperature, is possible post manufacture. The closing force will affect the temperature at which the valve opens, and also the flow rate at a particular temperature.

As a result of manufacturing tolerances, including uncertainties in the amount of heat applied during welding and therefore the closing force of the cooled valve, there will be some degree of variability in the above parameters of the finished valves. Thus, the provision of some adjustment in these parameters is desirable, to enable a reduction in the variability of performance between valves. Further if, due to manufacturing variability, the closing force for a particular valve is especially high, then the valve can be prone to cold seizure, whereby the valve seat and nozzle become stuck together, thus preventing the valve from opening. Conversely, if the closing force is lower than required, then the valve may not close adequately when cold.

The valve described in EP-A-1204906 comprises fourteen components and it is desirable to reduce the number of components used in a valve to simplify assembly and reduce the cost. Additionally, the valve of EP-A-1204906 uses laser welding to join the components. Since laser welding is a complicated and expensive process, it may be desirable to avoid using this process in some circumstances.

It is an object of the present invention to provide a valve having a post-manufacture means of adjustment.

The invention provides a valve device comprising; a body portion having a plurality of openings, a valve seat located within said body portion, an end stop, corresponding to an opening of said body portion, said end stop comprising a port portion through which fluid may flow and a nozzle, in fluid communication with said port portion, said nozzle configured for sealing against said valve seat and thereby preventing flow through the valve device, the valve device being openable by relative motion of said nozzle with respect to said valve seat, and adjustment means configured to allow independent adjustment of the location of said nozzle with respect to said valve seat.

By providing an independent adjustment means, the parameters of the valve can be adjusted post manufacture, and may be configured to obtain a desired performance.

The device may comprise more than one end stop, and each of said end stops may comprise a nozzle.

The actuation means may comprise forming said body portion from materials that have different thermal expansion properties to the materials from which at least one of said end stop or stops is formed.

The valve may be configured such that a variation in the temperature of the valve, or a part thereof, causes a change to the ratio of the lengths of said body portion to those of said end stop or stops.

By configuring the valve in this manner, the valve can be made to open and close in response to such a variation in temperature.

The valve may further comprise means to apply heat to or extract heat from the body portion. Such means may comprise an electrical resistance element, or other electrical heating means.

The length of the body portion may alternatively be adjusted by other means, such as by the application of mechanical force and/or use of a piezoelectric element. Use of a mechanical force, for example as provided by a piezoelectric element, has the advantage that the valve is immune to ambient temperature fluctuation. In addition, mechanical adjustment of the body portion length benefits from a fast actuation time and does not suffer from delays which can occur with thermal expansion. Not using a heating wire or coil dispenses with any potentially undesirable effects of electromagnetic radiation which would be produced by the current flowing in the wire or coil.

The adjustment means may comprise a threaded nut that mates with a thread on the external surface of the tubular body portion, and engages with an end stop such that a variable force may be applied to the end stop in a direction parallel to the axis of the tubular body portion.

The end stop or stops may be sealed in a flexible manner such that the depth of the end stop in the body portion may be varied, whilst maintaining an effective seal between the end stop and body portion.

The flexible sealing means may comprise a flexible gasket material. The flexible gasket material may comprise gold, or another malleable metal or alloy.

The valve seat may be manufactured from a material having a high degree of hardness, such as sapphire or other types of crystal, ceramic, metal or glass.

The end stop or stops may be manufactured from a material having a lower coefficient of thermal expansion than that of the body portion.

For example, the end stop or stops may be manufactured from 'Invar®' and the body portion may be manufactured from stainless steel.

The invention will now be described in further detail with reference to the figures in which.

Figure 1:
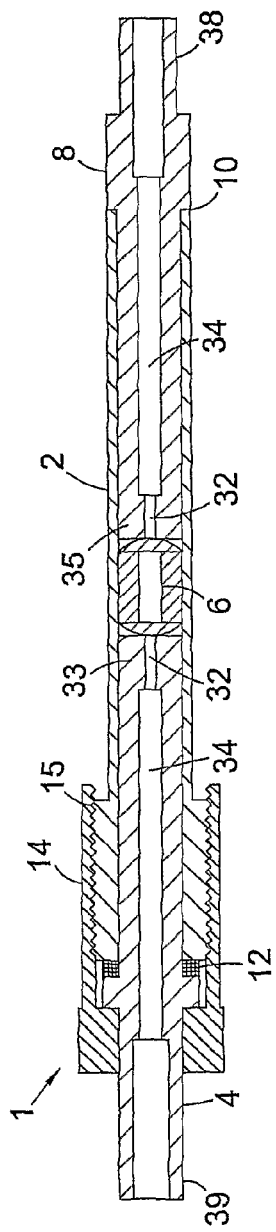
FIG. 1 shows a cross-section of a valve according to an embodiment of the invention.

FIG. 1 shows a valve for controlling the flow of a gas according to an embodiment of the present invention. The valve can also be used for controlling the flow of a liquid. The valve 1 has a main body 2 in the form of a rigid tubular structure, which may be formed from, for example, a metal such as stainless steel. The main body 2 approximates a cylinder that is open at either end. A valve seat 6 is located inside the main body 2. The valve seat 6 will be described in greater detail with reference to FIG. 2.

Also located within the main body 2 are first and second end stops 4, 8, each end stop 4, 8 having a nozzle 33, 35 which is in fluid communication via a central bore 34 to a port 38, 39. The nozzle 33, 35 of each end stop 4, 8 is adjacent the valve seat 6 within the main body 2.

When the valve 1 is in use, and the nozzles 33, 35 of both end stops 4, 8 is spaced from the valve seat 6, the valve 1 is open and gas or liquid may pass through the valve 1. Conversely, when one or both of the nozzles 33, 35 abuts the valve seat 6, then that nozzle 35 or nozzles 33, 35 will be blocked, the flow of gas or liquid through the valve 1 will be prevented, and the valve 1 is therefore closed. Similarly, by varying the force which the nozzles 33, 35 exert on the valve seat 6, the rate of flow of fluid through the valve is controlled, which is known as proportional control.

The ends 38, 39 of each end stop 4, 8 that are distal to the valve seat 6 protrude from the main body 2 of the valve 1, and form the valve ports 38, 39. The valve ports 38, 39 are configured for connection to a gas handling system by, for example, use of compression fittings so that a gas tight seal between the end stops 4, 8 and a gas inlet and outlet (not shown) can be formed.

In the embodiment illustrated, the second end stop 8 is rigidly attached/fixed to the main body 2 by, for example, electron beam welding. The electron beam weld 10 also forms a gas tight seal between the end stop 8 and the main body 2.

The first end stop 4 is not rigidly fixed to the main body 2 and is able to slide relative to and within the main body 2. A flexible gasket 12 is situated between the end stop 4 and the end face of the main body 2 to provide a gas tight seal between this end stop 4 and the main body 2.

An adjustment nut 14 is provided around the non-rigidly fixed end stop 4 and the adjustment nut 14 engages with a thread 15 formed on the outer surface of the main body 2 such that rotation of the adjustment nut 14 provides a variable force to move the end stop 4 within the main body 2 in a direction parallel to the major axis of the cylinder of the main body 2, to provide proportional control of the flow of fluid through the valve 1.

In an alternative embodiment, both end stops 4, 8 may be connected to the main body 2 by flexible sealing means, and each of the end stops 4, 8 is provided with an adjustment nut 4 and gasket 12 as described above.

The main body 2 is constructed from a material that has a higher coefficient of thermal expansion than that of the material that forms the end stops 4, 8 and the valve seat 6. Thus, if the valve 1 is heated by some external heat source, the main body 2 will increase in length by a greater amount than the sum of the increases of the end stops 4, 8 and valve seat 6. The net effect of the expansion of the end stops 4, 8 and the main body 2 will be motion of the nozzles 33, 35 of the end stops 4, 8 away from the valve seat 6.

Since the valve 1 will be opened by motion of nozzles 33, 35 away from the valve seat 6 such that there is a gap between the nozzle 33, 35 of each end stop 4,8 and the valve seat 6, the application of heat to the valve 1 can be used to open the valve 1. Heat may be applied by, for example, an electrical resistance heater 48 (shown only in FIG. 6).

Similarly, if the valve 1 is subsequently allowed to cool, then the components will all contract. The net effect of the contraction will be to close the valve 1.

An example of a suitable material for the main body 2 is stainless steel, while suitable materials for the end stops 4, 8 will have a lower coefficient of thermal expansion than stainless steel, and thus differential thermal expansions of the components described above will occur. An example of a suitable material for the end stops 4, 8 is 'Invar®'.

In an alternative embodiment, the main body 2 is made from a low expansion material, while the end stops 4, 8 are made from a higher expansion material. In such an embodiment, the valve 1 will be opened by a reduction in its temperature.

Figure 2:
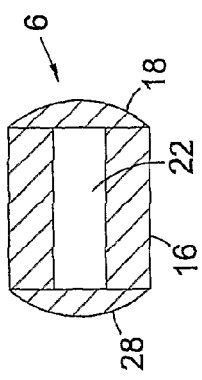
FIG. 2 is a cross-sectional view showing detail of a valve seat.

FIG. 2 shows further details of the valve seat 6. The valve seat 6 has a section 16 that is approximately cylindrical and of a diameter that permits the valve seat 6 to fit within the main body 2 of the valve. The valve seat 6 is sized relative to the internal diameter of the main body 2 such that, at ambient temperature, the valve seat 6 is held in a fixed position within the main body 2 by friction against the internal surface of the main body 2. At elevated temperatures, such as during thermal operation of the valve 1, the valve seat 6 is free to slide axially within the main body 2 as a result of the thermal expansion of the main body 2. An elevated temperature is also used during assembly of the valve 1 to permit the valve seat 6 to be positioned within the main body 2. Both ends 18, 28 of the valve seat 6 are formed with a convex curvature. The curvature may be spherical or non-spherical in profile.

The centres of curvature of the curved ends 18, 28 of the valve seat 6 are aligned with the axis of the valve seat 6, which is in turn aligned with the axis of the main body 2. Thus, the largest dimension of the valve seat 6 is coincident with the central axis of the valve 1. The cylindrical section 16 of the valve seat 6 is formed with one or more channels 22 that permit the flow of fluid past the valve seat 6 when it is located in the main body 2 of the valve 1. The channels 22 may be formed by removal of material from the surface of the valve seat 6 that is in contact with the internal surface of the main body 2, for example by flattening a section of this surface.

In an alternative embodiment, the channels 22 may be formed by one or more holes that pass through the valve seat 6 in a direction parallel to the axis of the main body 2.

The channels 22 are formed such that they do not extend to the portions of the convex surfaces 18, 28 that are in contact with the nozzles 33, 35 of the end stops 4, 8 when the valve 1 is in its closed position. Otherwise, the valve 1 will be permeable to the flow of gas even when in its closed state.

The valve seat 6 is formed from a rigid material that has a high degree of hardness, such as sapphire. The valve seat may have a Mohs hardness of 8 or greater.

Figure 3:
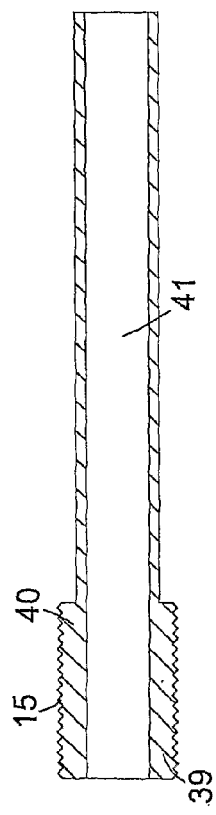
FIG. 3 is a cross-sectional view showing detail of an end stop.

FIG. 3 shows details of the main body 2. The main body 2 is formed from a tube in the form of a straight cylinder of material, and has a uniform circular bore 41 that runs along its length. The external surface of one end of the tube has a raised collar portion 40 that is machined with a thread 15. The axis of the thread is parallel with that of the tube.

Figure 4:
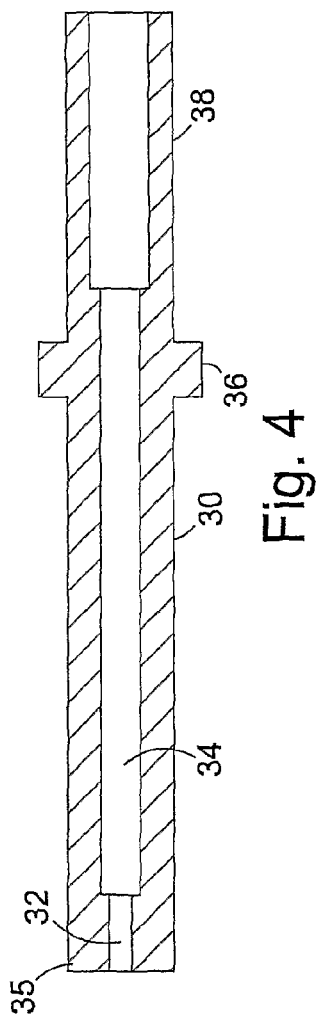
FIG. 4 is a cross-sectional view showing detail of the tubular body.

FIG. 4 shows further details of an end stop 4, 8. Both end stops 4, 8 may be of substantially the same construction. The end stop 4, 8 comprises a tube of material that has an external diameter suitable to permit a sliding fit within the main body 2 of the valve 1. The end stop 4, 8 has a central bore 34 that runs the complete length of the end stop 4, 8 such that fluid may flow through the centre of the end stop 4, 8. At the nozzle 33, 35 end of the end stop 4, 8, the central bore 34 has a section 32 that is narrower than the rest of the bore 34. The narrow section 32 facilitates sealing of the nozzle 33, 35 to the valve seat 6 when the valve is closed.

A collar 36 is provided on the external surface of the end stop 4, 8 at a position part way along the length of the end stop 4, 8. The diameter of the collar 36 is greater than the internal diameter the main body 2, thus the collar 36 provides means to locate the end of the end stop at a predefined position within the tube forming the main body 2 by locating the collar 36 against an end of the main body 2.

Upon insertion into the main body 2 the collar 36 of one of the end stops 4, 8 may be welded in place at the junction of the collar 36 and the end of the main body 2. The welding may be accomplished by, for example, electron beam welding or various other welding techniques. The weld forms a gas tight seal to prevent leakage of gas from the valve 1.

The port portion 38 of the end stop 4, 8 protrudes from the main body portion 2, and is configured to accept standard fittings for gas handling equipment, such as compression fittings.

The end face of the nozzle 33, 35 of the end stop 4, 8 is formed into a plane surface that is oriented at right angles to the axis of the end stop 4, 8. The reduced diameter central bore 32 thus forms a circular hole in the end face of the nozzle 33, 35. Thus, when the end face of the nozzle 33, 35 is brought into contact with the valve seat 6, the curved surface of the valve seat 28, 18 forms a seal over the end of the central bore 32 of the end stop 4, 8.

Thus, when the valve seat 6 is in contact with the end stop 4, 8 no gas may pass through the central bore 34 of the end stop 4, 8.

In an alternative embodiment, the end face of the nozzle 33, 35 of each end stop 4, 8 is coated with a layer of gold (not shown), or other malleable material, such as a metal (e.g., copper) or alloy. By using a malleable material on the nozzle 33, 35, the surface can deform slightly when it is pressed against the valve seat 6. This deformation will tend to improve the impermeability of the seal formed between the nozzle 33, 35 and the valve seat 6, and thereby improve the impermeability of the valve.

Figure 5:
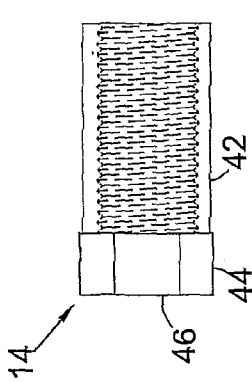
FIG. 5 is a cross-sectional view showing detail of the nut adjuster.

FIG. 5 shows further detail of the adjustment nut 14. The adjustment nut 14 has a cylindrical inner surface, which is machined with a thread. The internal diameter and pitch of the thread are suitable to allow the thread to mate with the thread 15 on the external surface 40 of the main body 2. A portion 44 of the external surface of the nut 14 is machined such that it is suitable to accept a spanner or other device for applying rotational torque to the adjustment nut 14. One end of the nut 14 has a collar portion 46 having a smaller internal diameter than the rest of the nut. The diameter of the collar portion 46 is sized such that the port 38 of the end stops 4, 8 may pass through it, but that the collar 36 of the end stop 4 cannot pass through.

Thus, with reference to FIG. 1, when the valve 1 is assembled with the nozzle 33, 35 of the end stops 4, 8 inside the main body 2 and the nut threaded on to the thread 15 of the main body 2, the collar 46 of the adjustment nut 14 can apply a force to the collar 36 of the end stop 4. This force may be varied by rotation of the nut 14 to provide proportional control of the flow of fluid through the valve 1.

Also with reference to FIG. 1, a flexible gasket 12, in the form of a ring of material, is located between the collar 36 of the end stop 4 and the end portion 40 of the main body 2. The gasket 12 both forms a gas tight seal between the collar 36 of the end stop 4 and the end 40 of the main tube 2, and also simultaneously permits some flexibility in the location of the end stop 4 within the main tube 2.

Thus, by turning the adjustment nut 14 the location of the end of the nozzle 33, 35 of the end stop 4 in relation to the valve seat 6 can be adjusted. This adjustment permits variation of the opening temperature of the valve 1 as described above.

Figure 6:
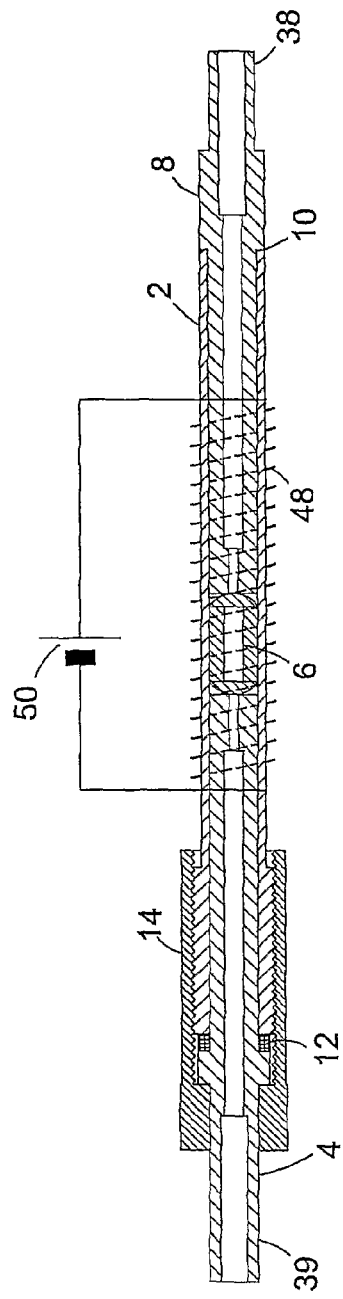
FIG. 6 shows a valve in accordance with an embodiment of the invention with a heating element attached.

FIG. 6 shows a valve according to an embodiment of the present invention with a heating device attached. The heating device shown is a coil of resistance wire 48 that is wound around the central portion of the main body 2 of the valve 1. The resistance wire 48 is electrically insulated from the main body 2, but is mounted on the main body 2 so that the thermal resistance between the wire 48 and main body 2 is low. When a current is applied to the wire, shown in the Figure by means of a battery 50, the wire 48 heats up, and transfers heat to the main body 2.

In further embodiments, the heat may be applied to the main body 2 by use of other sources of heat, such as power resistors, peltier devices or light sources. The light source could be infrared. The entire valve may be housed in a temperature-controlled environment, and the temperature of this environment adjusted to open or close the valve.

The opening properties of the valve 1 may be set in two ways. Firstly, the valve may be maintained at a predetermined temperature, and the adjustment nut 14 rotated until the flow of gas is just prevented. This then defines a temperature at which the valve will start to open, and start to permit the flow of gas. Raising the temperature of the valve above this point will permit higher flow rates, the flow rate increasing with increasing temperature.

Secondly, the valve can be maintained at a predetermined temperature, and the flow rate adjusted by rotating the adjustment nut 14 until a desired fluid flow rate is achieved. Thus, if an application requires a particular flow rate to be used, this can be achieved by setting the temperature of the valve to the predetermined temperature.

A calibration of flow rate versus temperature can be determined in either situation by using a suitable flow gauge to determine the proportional relationship between temperature and flow rate at given inlet and outlet pressures. The valve may be operated in a closed feedback loop by measuring the outlet pressure or flow rate and comparing this to the desired outlet pressure or flow rate and adjusting the valve temperature accordingly to achieve a desired outlet pressure or flow rate.

Figure 7:
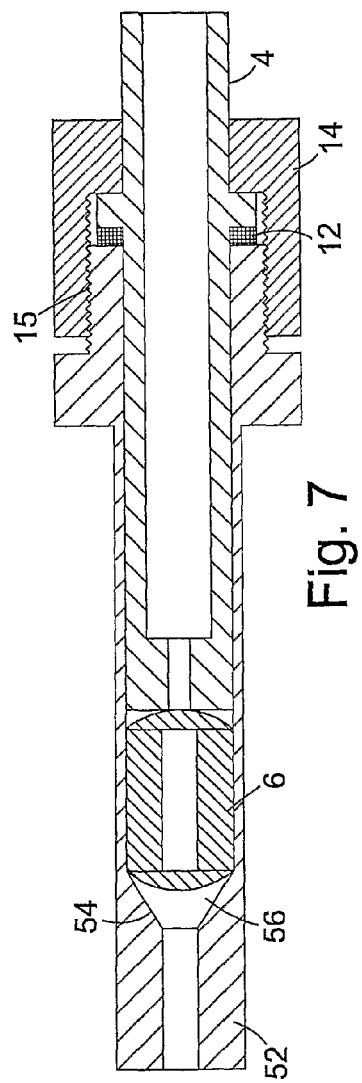
FIG. 7 shows a further embodiment of the invention, in which a single end stop is used.

FIG. 7 shows a further embodiment of the invention, in which only a single end stop 4 is used. The end stop 4 is located within a central bore 56 of a main body 52. The main body 52 is modified from that described above by being configured to accept an end stop 4 at only one end, while at the other end the main body 52 is configured to directly receive standard fittings for gas handling equipment, such as compression fittings.

The end stop 4 is sealed and fastened into the main body 52 by means of a gasket 12 and nut 14 as described above in relation to FIG. 1, and a thread 15 provided on a section of the outer surface the main body 52 to provide fixing for the nut 14.

A valve seat 6, the same as described above in relation to FIG. 2, is located within the central bore 56 of the main body 52. The central bore 56 of the main body 52 has a narrowed/tapered section 54 to provide means to locate the valve seat 6. The valve seat 6 is prevented from moving past the tapered section 54 since the diameter of the tapered section 54 is less than that of the valve seat 6.

Once assembled, the end stop 4 abuts the valve seat 6 such that the valve seat 6 is trapped between the end stop 4 and the tapered section 54 of the central bore 56 in the main body 52. In use, the end stop 4 seals onto the valve seat 6 to close the valve.

The end stop 4 may be manufactured from a material having a lower coefficient of thermal expansion to the material used to form the main body 53. Thus, the device shown in FIG. 7 can function in the same manner as described above in relation to FIGS. 1 to 5, and may therefore also be actuated by varying the temperature of the device.

Figure 8:
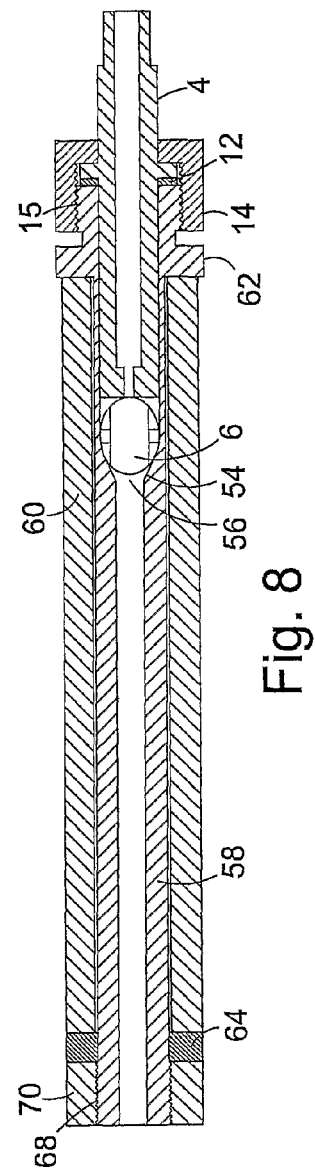
FIG. 8 shows a yet further embodiment of the invention, in which a mechanical means is used to actuate the valve.

FIG. 8 shows an alternative embodiment of the valve device, which provides for mechanical, rather than thermal, actuation of the valve. The force required to seal the valve device derives from the mechanical properties of the material used in construction. To actuate the device a mechanical force is applied to deform the material longitudinally, along its major axis. Actuation of a valve by mechanical rather than thermal means may, for example, be particularly useful when applying a valve for use in electric propulsion systems or in a cold gas thruster as used in a spacecraft. Similarly, mechanical actuation may be preferable in other applications where speed of operation, power requirement and reducing electromagnetic emissions are to be considered.

When using a mechanical force to effect the expansion of the main body portion, the skilled person will understand that the body portion can only be expanded within its elastic limit. In other words, the material from which the main body is made must have sufficient yield strength so that when it is subjected to a mechanical force, which provides a tensile force or stress, permanent deformation does not occur.

As with the embodiment described in relation to FIG. 7, the main body 58 is configured to accept an end stop 4 at only one end. A gasket 12 and nut 14 are again used to seal and fasten this end stop 4 into the main body 58, and a thread 15 is provided on a section of the outer surface of the main body 58 to provide fixing for the nut 14.

The other end of the main body 58 is again configured to accept standard fittings for gas handling equipment, such as compression fittings, and is also provided with a threaded section 68 on its outer surface.

A valve seat 6, as described above in relation to FIG. 2, is located within the central bore 56 of the main body 52. The main body 52 again has a narrowed/tapered section of its central bore 56, such that the valve seat 6 is prevented from moving past the tapered section 54. In use, the end stop 4 seals onto the valve seat 6 to close the valve.

The main body 58 has a protruding collar 62 formed on its external surface close to the end configured to accept the end stop 4. A hollow piezoelectric actuator 60 is located around the main body 58 of the valve device such that an end of the piezoelectric actuator 60 abuts the protruding collar 62.

The other end of the piezoelectric actuator 60 is attached to the end of the main body 58 by a washer 64 and nut 70 that mates with threaded section 68 of the main body 58. Both ends of the piezoelectric actuator 60 are therefore held in fixed relation to the main body 58.

The piezoelectric actuator 60 is configured to change in length on application of an electric field. Thus, by applying a suitable drive voltage to the piezoelectric actuator, a tensile force can be applied to the main body 58. The tensile force will tend to stretch the main body 58 and, when the force is sufficiently large, the end stop 4 will move away from the valve seat 6 thereby opening the valve. Actuation of the valve may therefore be controlled via the drive voltage. Increasing the drive voltage will result in proportionally increased longitudinal expansion and thus an increase in the flow rate. A calibration of flow rate versus voltage can be determined by using a suitable flow gauge to create a feed-back system which will allow proportional control.

When the drive voltage is lowered, the tensile force produced by the piezoelectric actuation decreases and the original length of the main body is restored, so that the valve closes.

In a further embodiment, a combination of mechanical and thermal actuation can be used to control actuation of the valve. This could be achieved for example through the use of a mechanical actuator such as a PZT device to apply a longitudinal tensile force to the body of the valve.

Figure 9:
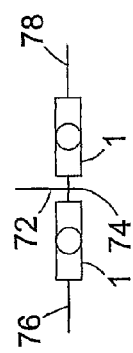
FIG. 9 shows a further embodiment of the invention, in which two valves are formed in combination to produce a three-port valve.

FIG. 9 shows a further embodiment of the invention in which two valves are combined to form a three-port valve. Three-port valves may be formed either by using two single port valves in combination, or by formation of a single three-port valve.

In FIG. 9, two valves 1 according to any of the above described embodiments are combined by connection of one port of each device to a common port 72 by use of a T-connector 74. Each valve 1 is independently controllable and adjustable as described above.

In use, fluid (liquid or gas) is supplied to the common port 72 and actuation of the valves 1 is used to switch the flow to either or both of the outlet ports 76, 78.

It will be apparent to those skilled in the art that various modifications and variations can be made to the valve without departing from the scope of the invention. Thus, it is intended that the present invention covers the modifications and variations of this invention provided they come within the scope of the appended claims.

The invention claimed is:

1. A valve device comprising:
a body portion having a plurality of openings,
a valve seat located within said body portion,
an end stop, corresponding to an opening of said body portion, said end stop comprising a port portion through which fluid may flow, and a nozzle, in fluid communication with said port portion, said nozzle configured for sealing against said valve seat and thereby preventing flow through the valve device,
the valve device being openable by adjusting a relative position of said nozzle with respect to said valve seat, and
adjustment means configured to provide adjustment of a position of said end stop with respect to said body portion for controlling flow of fluid through the valve device, wherein the flow is controllable by use of said adjustment means to provide proportional control;
wherein the adjustment means comprises a piezoelectric device to apply a mechanical force to said body portion so as to open said valve device and the adjustment means is actuatable by varying a piezoelectric voltage.

2. A valve device according to claim 1, wherein said body portion is formed from a material or materials having different thermal expansion properties to a material or materials from which said end stop is formed.

3. A valve device according to claim 2, wherein adjustment of the relative position of said nozzle and said valve seat is also achievable by altering the temperature of a valve device.

4. A valve device according to claim 1, further comprising a second end stop corresponding to a second opening of said body portion.

5. A valve device according to claim 4, wherein each of said end stops comprises a nozzle.

6. A valve device according to claim 1, comprising a threaded nut that mates with a thread on the external surface of said body portion, and that engages with said end stop such that a variable force is applicable to the end stop in a direction parallel to a major axis of the body portion.

7. A valve device according to claim 1, wherein said end stop is sealed to said body portion by a flexible means, such that said end stop is movable within said body portion while remaining sealed in a gas-tight manner to said body portion.

8. A valve device according to claim 1, wherein said end stop is manufactured from a material having a lower coefficient of thermal expansion than that of said body portion.

9. A valve device according to claim 1, further comprising means to apply heat to said body portion.

10. A valve device according to claim 1, the valve seat having a section that is approximately cylindrical and of a diameter that permits the valve seat to fit within the body portion of the valve, with both ends of the valve seat being formed with a convex curvature such that the valve seat has curved ends.

11. A valve device according to claim 10, wherein the curvature is spherical in profile.

12. A valve device according to claim 1, wherein said valve seat is formed from a material having a Mohs hardness of 8 or greater.

13. A valve device according to claim 12, wherein said material is sapphire.

14. A valve device according to claim 10, wherein the curvature is non-spherical in profile.

15. A valve device according to claim 10, wherein the centres of curvature of the curved ends of the valve seat are aligned with the axis of the valve seat, which is in turn aligned with the axis of the body portion.

16. A valve device according to claim 10, wherein the cylindrical section of the valve seat is formed with one or more channels that permit the flow of fluid past the valve seat, the channels not extending to the portions of the convex surfaces that are in contact with the nozzle of the end stop when the nozzle is sealed against said valve seat.

17. A valve device according to claim 1, wherein application of said piezoelectric voltage applies a tensile force so as to stretch said body portion and move said end stop away from said valve seat.

18. A valve device according to claim 1, wherein to close the valve device, an end face of the nozzle is brought into contact with the valve seat so that the valve seat forms a seal over an end of a central bore of the end stop.

19. A valve device according to claim 1, wherein to close the valve device, an end face of the nozzle is brought into contact with the valve seat, the end face of the nozzle being coated with a layer of a malleable material so that the end face can deform slightly when it is pressed against the valve seat.

20. A valve device comprising:
a body portion having a plurality of openings,
a valve seat located within said body portion,
an end stop, corresponding to an opening of said body portion, said end stop comprising a port portion through which fluid may flow, and a nozzle, in fluid communication with said port portion, said nozzle configured for sealing against said valve seat and thereby preventing flow through the valve device,
the valve device being openable by adjusting a relative position of said nozzle with respect to said valve seat, and
adjustment means configured to provide adjustment of a position of said end stop with respect to said body portion, wherein said adjustment means comprises a threaded nut that mates with a thread on the external surface of said body portion, and engages with said end stop such that a variable force is applicable to the end stop in a direction parallel to a major axis of the body portion.

* * * * *